United States Patent
Yao et al.

(10) Patent No.: US 9,405,161 B2
(45) Date of Patent: Aug. 2, 2016

(54) LIQUID CRYSTAL ARRAY SUBSTRATE, ELECTRONIC DEVICE, AND METHOD FOR TESTING LIQUID CRYSTAL ARRAY SUBSTRATE

(71) Applicant: SHENZHEN CHINA STAR OPTOELECTRONICS TECHNOLOGY CO., LTD., Shenzhen, Guangdong (CN)

(72) Inventors: Xiaohui Yao, Guangdong (CN); Je Hao Hsu, Guangdong (CN)

( * ) Notice: Subject to any disclaimer, the term of this patent is extended or adjusted under 35 U.S.C. 154(b) by 0 days.

(21) Appl. No.: 13/983,777

(22) PCT Filed: Jun. 30, 2013

(86) PCT No.: PCT/CN2013/078535
§ 371 (c)(1),
(2) Date: Aug. 6, 2013

(87) PCT Pub. No.: WO2014/201723
PCT Pub. Date: Dec. 24, 2014

(65) Prior Publication Data
US 2016/0124279 A1 May 5, 2016

(30) Foreign Application Priority Data

Jun. 19, 2013 (CN) .......................... 2013 1 0244594

(51) Int. Cl.
| | |
|---|---|
| H01L 27/14 | (2006.01) |
| G02F 1/1362 | (2006.01) |
| G09G 3/36 | (2006.01) |
| G02F 1/1343 | (2006.01) |
| G02F 1/1368 | (2006.01) |

(52) U.S. Cl.
CPC ........ G02F 1/136286 (2013.01); G02F 1/1368 (2013.01); G02F 1/134309 (2013.01); G09G 3/3659 (2013.01); G02F 2001/136254 (2013.01); G09G 2300/0447 (2013.01); G09G 2300/0852 (2013.01); G09G 2330/08 (2013.01)

(58) Field of Classification Search
CPC ............ G02F 1/1368; G02F 1/136286; G02F 1/134309
USPC .......................................................... 257/72
See application file for complete search history.

(56) References Cited

U.S. PATENT DOCUMENTS

| | | | | |
|---|---|---|---|---|
| 5,204,659 | A * | 4/1993 | Sarma ................. | G02F 1/13624 345/89 |
| 2007/0177067 | A1* | 8/2007 | Kim ..................... | G02F 1/13624 349/43 |
| 2009/0273550 | A1* | 11/2009 | Vieri .................... | G09G 3/3648 345/87 |
| 2010/0214326 | A1* | 8/2010 | Yoshiga ............... | G09G 3/3659 345/690 |
| 2015/0015821 | A1* | 1/2015 | Lo ........................ | G02F 1/1368 349/43 |

* cited by examiner

Primary Examiner — Douglas Menz

(57) ABSTRACT

A liquid crystal (LC) array substrate includes a number of pixel regions, each pixel region includes a main region, a sub-region, and an adjustment thin film transistor (TFT), the adjustment TFT adjusts a ratio of voltage of the main region and the sub-region to achieve a LCS design. The main region comprises a first TFT and a main region array common electrode lead wire, the sub-region comprises a second TFT and a sub-region array common electrode lead wire, and the main region array common electrode lead wire and the sub-region array common electrode lead wire are electrically isolated. The main region array common electrode lead wire of all pixel regions of the LC array substrate are connected to a main region conductive pad, the sub-region array common electrode lead wire of all pixel regions of the LC array substrate are connected to a sub-region conductive pad.

14 Claims, 3 Drawing Sheets

LIQUID CRYSTAL ARRAY SUBSTRATE, ELECTRONIC DEVICE, AND METHOD FOR TESTING LIQUID CRYSTAL ARRAY SUBSTRATE

TECHNICAL FIELD OF THE INVENTION

The present invention relates to substrates, and more particularly, to a liquid crystal array substrate and an electronic device with the same, and a method for testing the liquid crystal array substrate.

BACKGROUND OF THE INVENTION

Nowadays, liquid crystal (LC) electronic device, such as liquid crystal display (LCD) and LCD television are more popular. A common LC electronic device usual has a multi-angle display mode. In the multi-angle display mode, because LC molecules are pointed to different directions when viewing at different viewing angles, which causes a color distortion when viewing at a large viewing angle. Usually, in order to improve the color distortion, one pixel of the LC molecule is divided to two parts when designing pixel region of the LC molecules, one part is a main region, and the other is a sub-region. The color distortion is improved by controlling voltage of the two regions. Therein, the design of dividing the pixel to the main region and the sub-region is referred to as a low color shift (LCS) design.

Corresponding, in order to guarantee the quality of the LC electronic device, a testing process is necessary when producing the LC electronic device. In order to enhance yield and decrease costing, a LC array substrate of the LC electronic device performs electrical performance test after the LC array substrate has been produced. However, for the pixel with the LCS design, it is hard to test whether pixels of the main region and the sub-region are short-circuited, namely is unqualified by using common method. Thus causing panels of the LC electronic device is degraded or is scrapped.

SUMMARY OF THE INVENTION

The present invention provides a liquid crystal array substrate, an electronic device, and method for test the liquid crystal array substrate, which capable of testing whether the liquid crystal array substrate is qualified easily.

A liquid crystal (LC) array substrate comprises a plurality of pixel regions, each pixel region comprises a main region, a sub-region, and an adjustment thin film transistor (TFT), the adjustment TFT is configured to adjust a ratio of voltage of the main region and the sub-region to achieve a LCS design; wherein, the main region comprises a first TFT and a main region array common electrode lead wire, the sub-region comprises a second TFT and a sub-region array common electrode lead wire, and the main region array common electrode lead wire and the sub-region array common electrode lead wire are electrically isolated; a gate of the first TFT is connected to a first scan line, a source of the first TFT is connected to a data line, a drain of the first TFT is connected to one pixel electrode and is coupled to the main region array common electrode lead wire; a gate of the second TFT is connected to the first scan line, a source of the second TFT is connected to the data line, a drain of the second TFT is connected to one pixel electrode and is coupled to the sub-region array common electrode lead wire; a source of the adjustment TFT is coupled to the drain of the first TFT, a drain of the adjustment TFT is electrically connected to the drain of the second TFT, a gate of the adjustment TFT is connected to a second scan line; the main region array common electrode lead wire of all pixel regions of the LC array substrate are connected to a main region conductive pad, the sub-region array common electrode lead wire of all pixel regions of the LC array substrate are connected to a sub-region conductive pad.

Therein, the first scan line is used to produce an on signal or an off signal to control the first TFT to turn on or off accordingly, the data line is configured to input a data driving signal to the first TFT when the first TFT is turned on, thus controlling a display of the main region.

Therein, the first scan line is further configured to produce the on signal or the off signal to control the second TFT to turn on or off accordingly.

Therein, the data line is further configured to input the data driving signal to the second TFT when the second TFT is turned on, thus controlling the display of the sub-region.

An electronic device comprising a liquid crystal (LC) array substrate, the LC array substrate comprises a plurality of pixel regions, each pixel region comprises a main region, a sub-region, and an adjustment thin film transistor (TFT), the adjustment TFT is configured to adjust a ratio of voltage of the main region and the sub-region to achieve a LCS design; wherein, the main region comprises a first TFT and a main region array common electrode lead wire, the sub-region comprises a second TFT and a sub-region array common electrode lead wire, and the main region array common electrode lead wire and the sub-region array common electrode lead wire are electrically isolated; a gate of the first TFT is connected to a first scan line, a source of the first TFT is connected to a data line, a drain of the first TFT is connected to one pixel electrode and is coupled to the main region array common electrode lead wire; a gate of the second TFT is connected to the first scan line, a source of the second TFT is connected to the data line, a drain of the second TFT is connected to one pixel electrode and is coupled to the sub-region array common electrode lead wire; a source of the adjustment TFT is coupled to the drain of the first TFT, a drain of the adjustment TFT is electrically connected to the drain of the second TFT, a gate of the adjustment TFT is connected to a second scan line; the main region array common electrode lead wire of all pixel regions of the LC array substrate are connected to a main region conductive pad, the sub-region array common electrode lead wire of all pixel regions of the LC array substrate are connected to a sub-region conductive pad.

Therein, the first scan line is used to produce an on signal or an off signal to control the first TFT to turn on or off accordingly, the data line is configured to input a data driving signal to the first TFT when the first TFT is turned on, thus controlling a display of the main region.

Therein, the first scan line is further configured to produce the on signal or the off signal to control the second TFT to turn on or off accordingly.

Therein, the data line is further configured to input the data driving signal to the second TFT when the second TFT is turned on, thus controlling the display of the sub-region.

Therein, the electronic device is a liquid crystal display (LCD) or a LCD television.

A method for testing a liquid crystal array substrate comprising: controlling a first TFT and the second TFT of each pixel region to turn off by inputting off signal via a scan line; applying a first voltage to a main region conductive pad and applying a second voltage to a sub-region conductive pad, wherein, the main region conductive pad is connected to a main region array common electrode lead wire of all pixel regions of the LC array substrate, the sub-region conductive pad is connected to a sub-region array common electrode lead wire of all pixel regions of the LC array substrate; the main region array common electrode lead wire and the sub-region array common electrode lead wire are electrically isolated; detecting whether the voltage of the main region is equal to the voltage of the sub-region; determining the main region and the sub-region are short circuited if the voltage of the main region is equal to the voltage of the sub-region.

Therein, the method further comprising: determining the main region and the sub-region are not short circuited if the voltage of the main region is not equal to the voltage of the sub-region.

Therein, the step of applying a first voltage to a main region conductive pad and applying a second voltage to a sub-region conductive pad comprises: applying a high voltage to the main region conductive pad and applying a low voltage to the sub-region conductive pad.

Therein, the step of applying a first voltage to a main region conductive pad and applying a second voltage to a sub-region conductive pad comprises: applying a low voltage to the main region conductive pad and applying a high voltage to the sub-region conductive pad.

Therein, the method further comprising: repairing the pixel region which is short-circuited.

The electronic device and the over-voltage protection circuit of the present invention capable of executing over-voltage protection quickly when the electronic device is worked at the 2D mode or the 3D mode.

DETAILED DESCRIPTION OF THE PREFERRED EMBODIMENTS

Figure 1:
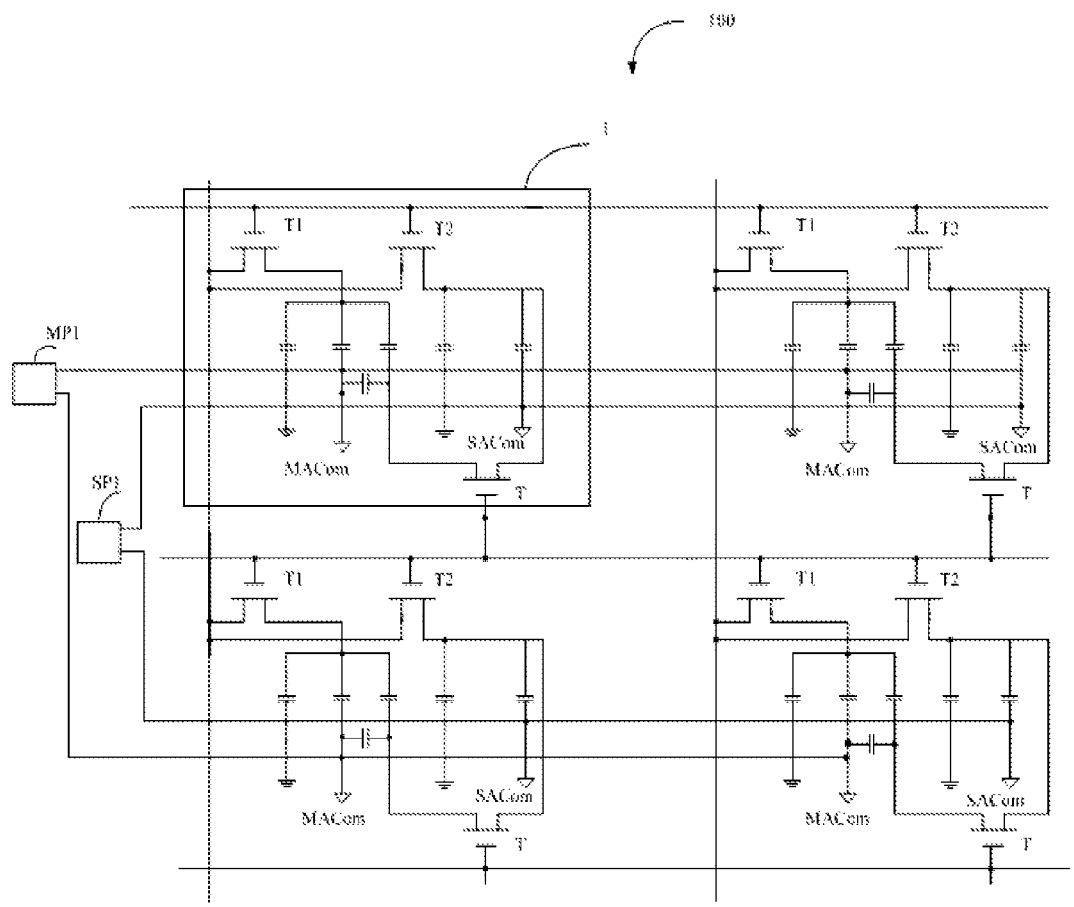
FIG. 1 is a schematic diagram of a liquid crystal array substrate of an embodiment.
Figure 2:
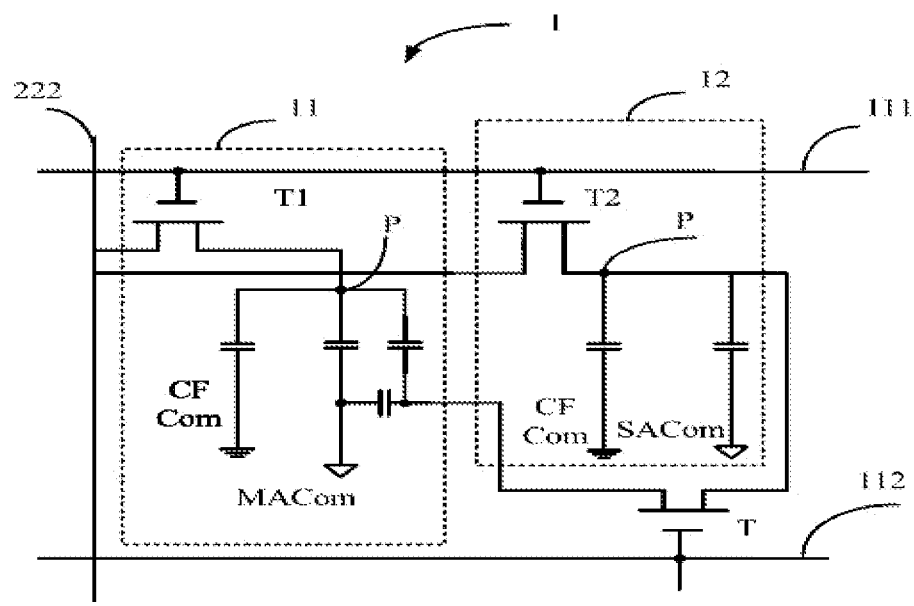
FIG. 2 is a schematic diagram of a pixel region of a liquid crystal array substrate of an embodiment.

Referring to FIGS. 1 and 2 together, FIG. 1 is a schematic diagram of a liquid crystal (LC) array substrate 100, FIG. 2 is a schematic diagram of a pixel region 1 included by the LC array substrate 100. In the embodiment, the LC array substrate 100 has the low color shift (LCS) design. The LC array substrate 100 includes a number of pixel region 1 arranged in array mode. The pixel region 1 includes a main region 11, a sub-region 12, and an adjustment thin film transistor (TFT) T. The main region 11 includes a first TFT T1 and a main region array common electrode lead wire MAcom. The sub-region 12 includes a second TFT T2 and a sub-region array common electrode lead wire SAcom. The adjustment TFT T is used to adjust a ratio of voltage of the main region 11 and the sub-region 12, thus achieving the LCS design.

Gates of the first TFT T1 and the second TFT T2 of each pixel region 1 are connected to a first scan line 111. Sources of the first TFT T1 and the second TFT T2 of each pixel region 1 are connected to a data line 222. A drain of the first TFT T1 is coupled to the main region array common electrode lead wire MAcom. A drain of the second TFT T2 is coupled to the sub-region array common electrode lead wire SAcom. The drain of the first TFT T1 is also connected to a corresponding pixel electrode P, the drain of the second TFT T2 is also connected to a corresponding pixel electrode P.

In detail, a source of the adjustment TFT T is coupled to the drain of the first TFT T1, a drain of the adjustment TFT T is electrically connected to the drain of the second TFT T2, a gate of the adjustment TFT T is connected to a second scan line 112. The adjustment TFT T is used to adjust the ratio of the voltage of the main region 11 and the sub-region 12, namely adjust a ratio of voltage of the pixel electrode P connected to the first TFT T1 and the pixel electrode P connected to the second TFT T2. Thus achieving the LCS design.

In the embodiment, the main region array common electrode lead wire MAcom and the sub-region array common electrode lead wire SAcom are electrically isolated.

As shown in FIG. 1, the main region array common electrode lead wire MAcom of all pixel regions 1 of the LC array substrate 100 are connected to a main region conductive pad MP1. The sub-region array common electrode lead wire SAcom of all pixel regions 1 of the LC array substrate 100 are connected to a sub-region conductive pad SP1.

Therein, the first scan line 111 connected to the first TFT T1 and the second TFT T2 is used to produce an on signal or an off signal to control the first TFT T1 and the second TFT T2 to turn on or off accordingly. The data line 222 is used to input data driving signal to the first TFT T1 and the second TFT T2 when the first TFT T1 and the second TFT T2 are turned on, thus controlling the display of the main region 11 and the sub-region 12.

The LC array substrate 100 also includes other elements, such as storage capacitor and coupling capacitor, because these elements are unrelated to the present invention, the description about these elements are omitted.

Figure 3:
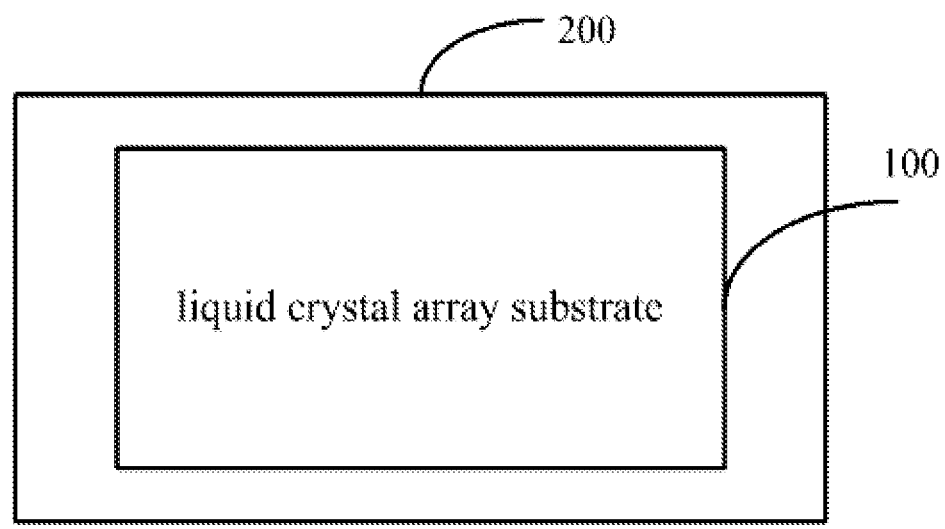
FIG. 3 is a schematic diagram of an electronic device with a liquid crystal array substrate.

Referring to FIG. 3, an electronic device 200 includes the LC array substrate 100 is illustrated. The electronic device 200 includes the LC array substrate 100 and other necessary elements. The electronic device 200 can be a LCD or a LCD television. Obviously, the electronic device 200 also can be any device with LCD structure.

Figure 4:
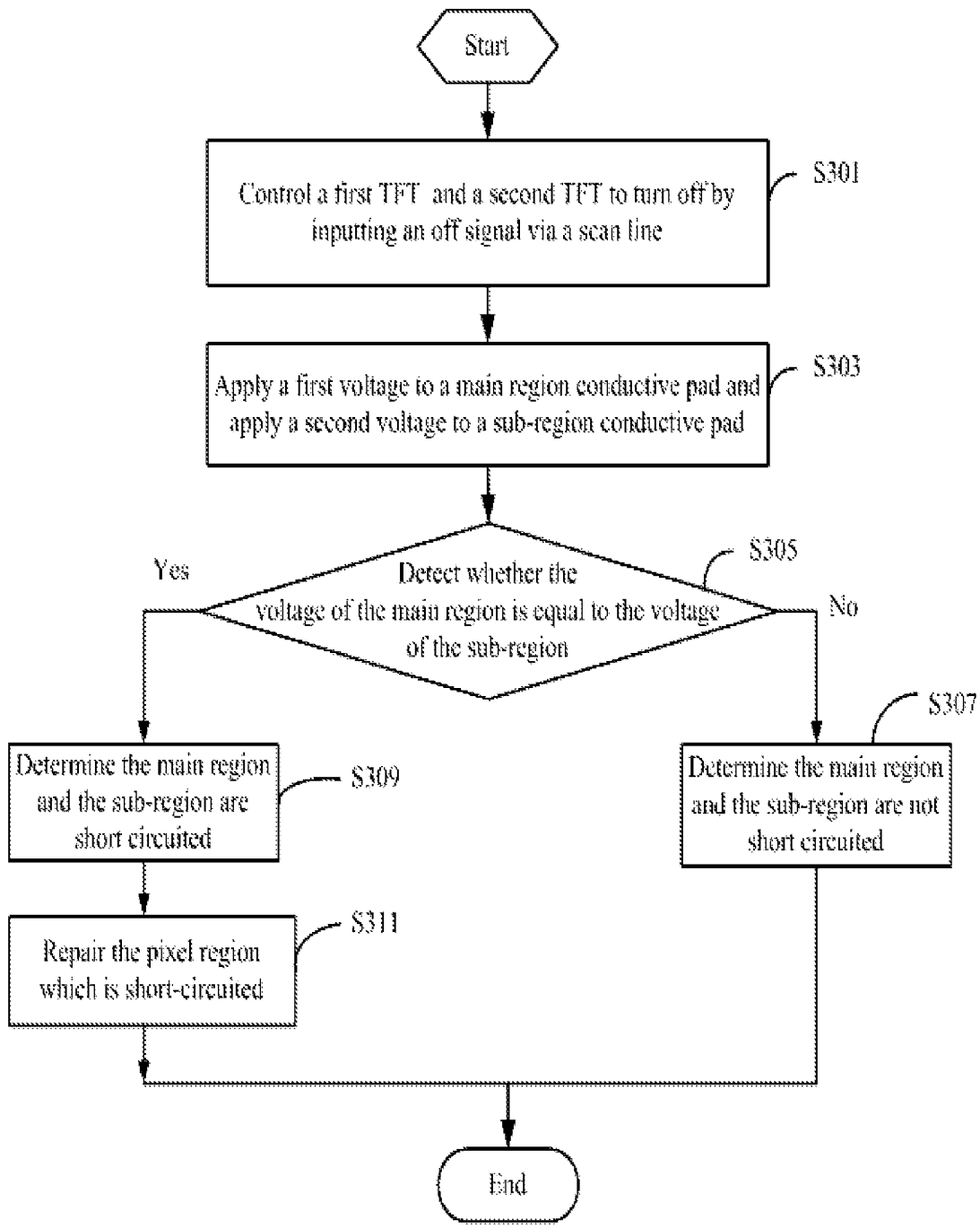
FIG. 4 is a flowchart illustrates a method for testing a liquid crystal array substrate.

Referring to FIG. 4 together, a method for testing the LC array substrate 100 is illustrated. At first, controlling the first TFT T1 and the second TFT T2 to turn off by inputting off signal via the first scan line 111 (S301).

Applying a first voltage to the main region conductive pad MP1 and apply a second voltage to the sub-region conductive pad SP1 (S303). Therein, the first voltage is different from the second voltage. In the embodiment, the first voltage is a high voltage and the second voltage is a low voltage, applying a first voltage to the main region conductive pad MP1 and apply a second to the sub-region conductive pad SP1 is: applying the high voltage to the main region conductive pad MP1 and apply the low voltage to the sub-region conductive pad SP1. In another embodiment, the first voltage is the low voltage and the second voltage is the high voltage, applying a first voltage to the main region conductive pad MP1 and apply a second to the sub-region conductive pad SP1 is: applying the low voltage to the main region conductive pad MP1 and apply the high voltage to the sub-region conductive pad SP1.

Detecting whether the voltage of the main region 11 is equal to the voltage of the sub-region 12 (S305).

If not, determines the main region 11 and the sub-region 12 are not short circuited, namely the LC array is qualified (S307).

If yes, then determines the main region 11 and the sub-region 12 are short circuited, namely the LC array is not qualified (S309).

Repairing the pixel region 1 which is short-circuited (S311).

In the embodiment, through ensuring the main region array common electrode lead wire MAcom and the sub-region array common electrode lead wire SAcom are electrically isolated. Because the main region array common electrode lead wire MAcom is electrically connected to the main region 11, and the sub-region array common electrode lead wire SAcom is electrically connected to the sub-region 12. Therefore, when the main region 11 and the sub-region 12 are not short circuited, the main region 11 and the sub-region 12 respectively has the first voltage and the second voltage and different from each other. When the main region 11 and the sub-region 12 are short circuited, the voltage of the main region 11 and the sub-region 12 would be the same. In the embodiment, whether the main region 11 and the sub-region 12 are short-circuited is: whether the pixel electrode P connected to the first TFT T1 of the main region 11 and the pixel electrode P connected to the second TFT T2 of the sub-region 12 are short circuited.

The present invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A liquid crystal (LC) array substrate, comprising a plurality of pixel regions, each pixel region comprises a main region, a sub-region, and an adjustment thin film transistor (TFT), the adjustment TFT is configured to adjust a ratio of voltage of the main region and the sub-region to achieve a LCS design;
wherein, the main region comprises a first TFT and a main region array common electrode lead wire, the sub-region comprises a second TFT and a sub-region array common electrode lead wire, and the main region array common electrode lead wire and the sub-region array common electrode lead wire are electrically isolated; a gate of the first TFT is connected to a first scan line, a source of the first TFT is connected to a data line, a drain of the first TFT is connected to one pixel electrode and is coupled to the main region array common electrode lead wire; a gate of the second TFT is connected to the first scan line, a source of the second TFT is connected to the data line, a drain of the second TFT is connected to one pixel electrode and is coupled to the sub-region array common electrode lead wire; a source of the adjustment TFT is coupled to the drain of the first TFT, a drain of the adjustment TFT is electrically connected to the drain of the second TFT, a gate of the adjustment TFT is connected to a second scan line: the main region array common electrode lead wire of all pixel regions of the LC array substrate are connected to a main region conductive pad, the sub-region array common electrode lead wire of all pixel regions of the LC array substrate are connected to a sub-region conductive pad, wherein a sharing capacitor is connected between the pixel electrode of the drain of the first TFT and the source of the adjustment TFT, a coupling capacitor is connected between the main region array common electrode lead wire of the main region and the source of the adjustment TFT, the sharing capacitor and the coupling capacitor are arranged in parallel to each other.

2. The LC array substrate of claim 1, wherein the first scan line is configured to produce an on signal or an off signal to control the first TFT to turn on or off accordingly, the data line is configured to input a data driving signal to the first TFT when the first TFT is turned on, thus controlling a display of the main region.

3. The LC array substrate of claim 2, wherein the first scan line is further configured to produce the on signal or the off signal to control the second TFT to turn on or off accordingly.

4. The LC array substrate of claim 3, wherein the data line is further configured to input the data driving signal to the second TFT when the second TFT is turned on, thus controlling the display of the sub-region.

5. An electronic device, comprising a liquid crystal (LC) array substrate, the LC array substrate comprises a plurality of pixel regions, each pixel region comprises a main region, a sub-region, and an adjustment thin film transistor (TFT), the adjustment TFT is configured to adjust a ratio of voltage of the main region and the sub-region to achieve a LCS design;
wherein, the main region comprises a first TFT and a main region array common electrode lead wire, the sub-region comprises a second TFT and a sub-region array common electrode lead wire, and the main region array common electrode lead wire and the sub-region array common electrode lead wire are electrically isolated; a gate of the first TFT is connected to a first scan line, a source of the first TFT is connected to a data line, a drain of the first TFT is connected to one pixel electrode and is coupled to the main region array common electrode lead wire; a gate of the second TFT is connected to the first scan line, a source of the second TFT is connected to the data line, a drain of the second TFT is connected to one pixel electrode and is coupled to the sub-region array common electrode lead wire; a source of the adjustment TFT is coupled to the drain of the first TFT, a drain of the adjustment TFT is electrically connected to the drain of the second TFT, a gate of the adjustment TFT is connected to a second scan line; the main region array common electrode lead wire of all pixel regions of the LC array substrate are connected to a main region conductive pad, the sub-region array common electrode lead wire of all pixel regions of the LC array substrate are connected to a sub-region conductive pad, wherein a sharing capacitor is connected between the pixel electrode of the drain of the first TFT and the source of the adjustment TFT, a coupling capacitor is connected between the main region array common electrode lead wire of the main region and the source of the adjustment TFT, the sharing capacitor and the coupling capacitor are arranged in parallel to each other.

6. The electronic device of claim 5, wherein the first scan line is configured to produce an on signal or an off signal to control the first TFT to turn on or off accordingly, the data line is configured to input a data driving signal to the first TFT when the first TFT is turned on, thus controlling a display of the main region.

7. The electronic device of claim 6, wherein the first scan line is further configured to produce the on signal or the off signal to control the second TFT to turn on or off accordingly.

8. The electronic device of claim 7, wherein the data line is further configured to input the data driving signal to the second TFT when the second TFT is turned on, thus controlling the display of the sub-region.

9. The electronic device of claim 5, wherein the electronic device is a liquid crystal display (LCD) or a LCD television.

10. A method for testing a liquid crystal array substrate, comprising:
controlling a first TFT and the second TFT of each pixel region to turn off by inputting off signal via a scan line;

applying a first voltage to a main region conductive pad and applying a second voltage to a sub-region conductive pad, wherein, the main region conductive pad is connected to a main region array common electrode lead wire of all pixel regions of the LC array substrate, the sub-region conductive pad is connected to a sub-region array common electrode lead wire of all pixel regions of the LC array substrate; the main region array common electrode lead wire and the sub-region array common electrode lead wire are electrically isolated, wherein a sharing capacitor is connected between the pixel electrode of the drain of the first TFT and the source of the adjustment TFT, a coupling capacitor is connected between the main region array common electrode lead wire of the main region and the source of the adjustment TFT, the sharing capacitor and the coupling capacitor are arranged in parallel to each other;

detecting whether the voltage of the main region is equal to the voltage of the sub-region;

determining the main region and the sub-region are short circuited if the voltage of the main region is equal to the voltage of the sub-region.

11. The method of claim 10, further comprising:

determining the main region and the sub-region are not short circuited if the voltage of the main region is not equal to the voltage of the sub-region.

12. The method of claim 10, wherein the step of applying a first voltage to a main region conductive pad and applying a second voltage to a sub-region conductive pad comprises:

applying a high voltage to the main region conductive pad and applying a low voltage to the sub-region conductive pad.

13. The method of claim 10, wherein the step of applying a first voltage to a main region conductive pad and applying a second voltage to a sub-region conductive pad comprises:

applying a low voltage to the main region conductive pad and applying a high voltage to the sub-region conductive pad.

14. The method of claim 10, further comprising:

repairing the pixel region which is short-circuited.

\* \* \* \* \*